United States Patent
Koopmann et al.

(10) Patent No.: US 9,816,425 B1
(45) Date of Patent: *Nov. 14, 2017

(54) AIR HEATING APPARATUS

(71) Applicant: JR KOOP, INC., Sioux Falls, SD (US)

(72) Inventors: Richard R. Koopmann, Sioux Falls, SD (US); Nathan Thompson, Brandon, SD (US); Luke Tooley, Viborg, SD (US); Joseph Naglestad, Parker, SD (US); Chris Wielenga, Sioux Falls, SD (US)

(73) Assignee: JR Koop, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,798

(22) Filed: Jun. 10, 2016

Related U.S. Application Data

(63) Continuation of application No. 12/699,343, filed on Feb. 3, 2010, now Pat. No. 9,366,170.

(51) Int. Cl.
*F01N 5/02* (2006.01)
*F24H 3/06* (2006.01)

(52) U.S. Cl.
CPC .............. *F01N 5/02* (2013.01); *F24H 3/06* (2013.01); *F24D 2200/26* (2013.01)

(58) Field of Classification Search
CPC ....................................................... F01N 5/02
USPC ....................... 126/99 R, 247, 110 A; 60/320
See application file for complete search history.

(56) References Cited

U.S. PATENT DOCUMENTS

| | | | |
|---|---|---|---|
| 3,036,382 A | 5/1962 | Shotton | |
| 3,765,398 A * | 10/1973 | Morris | F24H 3/065 |
| | | | 126/110 B |
| 3,768,546 A | 10/1973 | Shipes | |
| 3,771,593 A | 11/1973 | Shepheard | |
| 3,968,649 A | 7/1976 | Edwards | |
| 4,307,701 A | 12/1981 | Balon | |
| 4,365,614 A | 12/1982 | Grover | |
| 4,462,386 A | 7/1984 | Powell | |
| 4,739,153 A * | 4/1988 | Rendel | F24H 3/0411 |
| | | | 126/110 B |
| 5,819,724 A | 10/1998 | Hybertson | |
| 5,950,446 A | 9/1999 | Tromblee | |
| 6,186,138 B1 * | 2/2001 | Hybertson | F24D 3/16 |
| | | | 126/110 A |
| 6,984,362 B2 | 1/2006 | Hara | |

(Continued)

*Primary Examiner* — Avinash Savani
*Assistant Examiner* — Aaron Heyamoto
(74) *Attorney, Agent, or Firm* — Jeffrey A. Proehl; Woods, Fuller, Shultz & Smith, P.C.

(57) ABSTRACT

An air heating apparatus may comprise a housing with a path through an interior of the housing between openings in the housing. An isolating wall may divide the interior into primary and secondary chambers, and may have a transfer opening through which the path extends from the primary to secondary chambers. An air heating assembly may comprise an engine in the primary chamber, a heat generator in the primary chamber and connected to the engine, and a main heat exchanger in the secondary chamber and in fluid communication with the heat generator to transfer heat generated by the heat generator to air flowing along the path. The apparatus may include an air movement assembly configured to move air along the path and comprises a primary fan between the primary and secondary chambers to move air from the primary chamber to the secondary chamber.

15 Claims, 3 Drawing Sheets

(56) References Cited

U.S. PATENT DOCUMENTS

| | | | |
|---|---|---|---|
| 7,001,140 B2 | 2/2006 | Hustvedt | |
| 7,156,611 B2 | 1/2007 | Oosawa | |
| 7,246,487 B2 | 7/2007 | Hara | |
| 7,345,386 B2 | 3/2008 | Dano | |
| 7,357,621 B2 | 4/2008 | Hustvedt | |
| 7,574,858 B2 | 8/2009 | Moody | |
| 7,614,367 B1 | 11/2009 | Frick | |
| 8,170,779 B2 | 5/2012 | Iwase | |
| 2002/0194846 A1* | 12/2002 | Moody | F01N 3/043 60/320 |
| 2003/0150326 A1 | 8/2003 | Chasen | |
| 2005/0175469 A1 | 8/2005 | Lucchi | |
| 2008/0286135 A1 | 11/2008 | Yoshida | |
| 2008/0302351 A1 | 12/2008 | Hunter | |

\* cited by examiner

AIR HEATING APPARATUS

BACKGROUND

Field

The present disclosure relates to heating apparatus and more particularly pertains to a new air heating apparatus for providing a flow of air with useful amounts of static pressure so that the flow may be communicated over greater distances than previously achieved.

Description of the Prior Art

The use of apparatus to heat air for purposes such as heating living spaces, warming equipment operating in extremely cold climates, removing moisture from structures or material, is known. One system that has been utilized is shown in FIG. 1. However, one drawback of the system depicted is that, despite the inclusion of a fan and a sufficient amount of air flow, the static pressure of the air flow has been limited, and as a result the ability to move the heated air over more useful distances through hoses connected to the apparatus has been limited. This has limited the ability to use the apparatus in some applications.

SUMMARY

In view of the foregoing, the present disclosure describes a new air heating apparatus which may be utilized for providing a flow of air with useful amounts of static pressure so that the flow may be communicated over greater distances than previously achieved.

The present disclosure relates to an air heating apparatus comprising a housing having at least one inlet opening and at least one outlet opening such that air may flow along a path through an interior of the housing between said openings. The housing may include an isolating wall dividing the interior of the housing into a primary chamber adjacent to the inlet opening and a secondary chamber adjacent to the outlet opening. The isolating wall may have a transfer opening formed therein through which the path extends from the primary chamber into the secondary chamber. The apparatus may also include an air heating assembly positioned in the interior of the housing and configured to heat air moving along the path. The air heating assembly may comprise an engine in the primary chamber configured to rotate a drive shaft, a heat generator in the primary chamber and operatively connected to the engine to generate heat in a fluid from rotation energy from the engine, and a main heat exchanger in the secondary chamber and in fluid communication with the heat generator to transfer heat generated by the heat generator to air flowing along the path. The apparatus may also include an air movement assembly configured to move air along the path through the interior of the housing. The air movement assembly may comprise a primary fan positioned along the path between the primary and secondary chambers to move air on the path from the primary chamber to the secondary chamber. The primary fan may be positioned proximate to the transfer opening in the isolating wall in a manner effective to move air from the primary chamber to the secondary chamber and from the secondary chamber out of the housing through the outlet opening.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
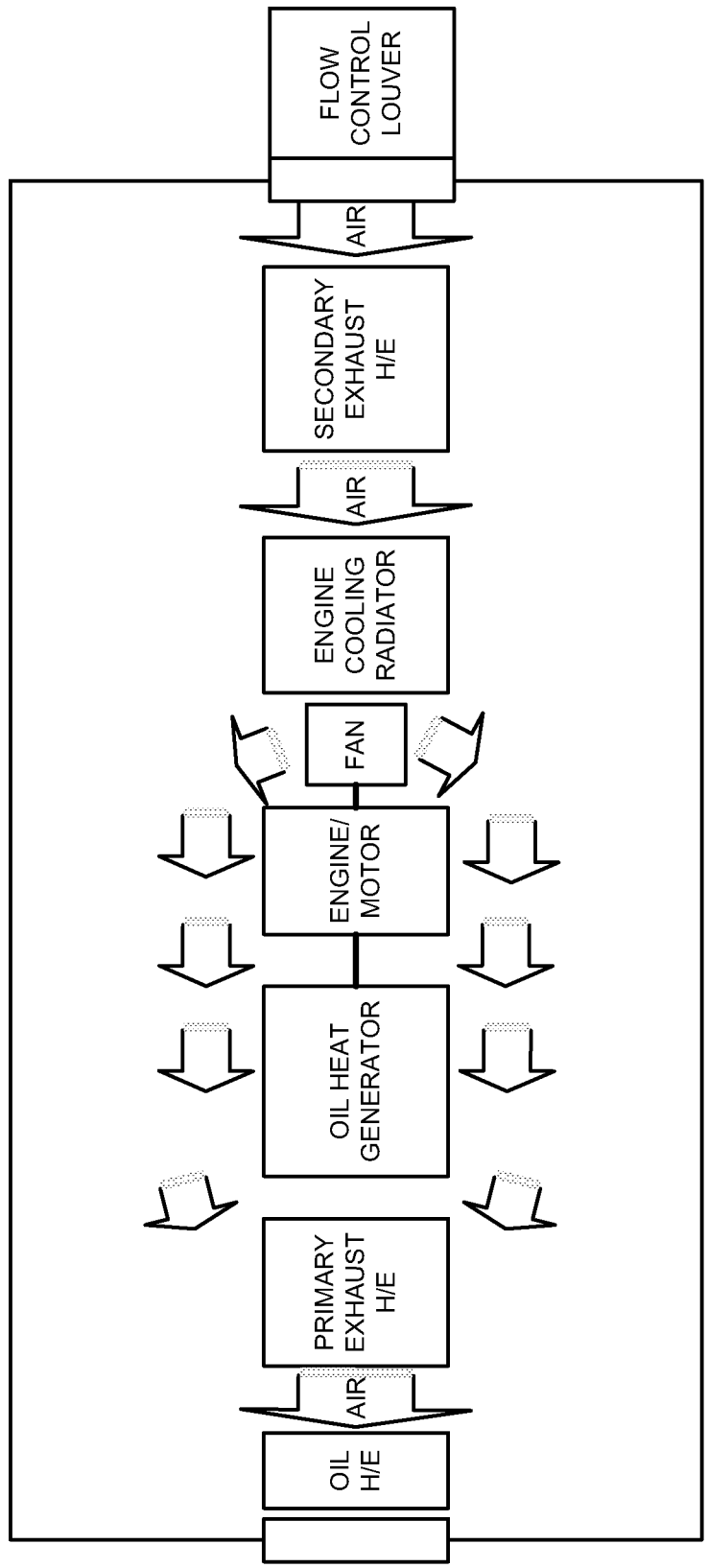
FIG. 1 is a schematic diagram of a known air heating apparatus.
Figure 2:
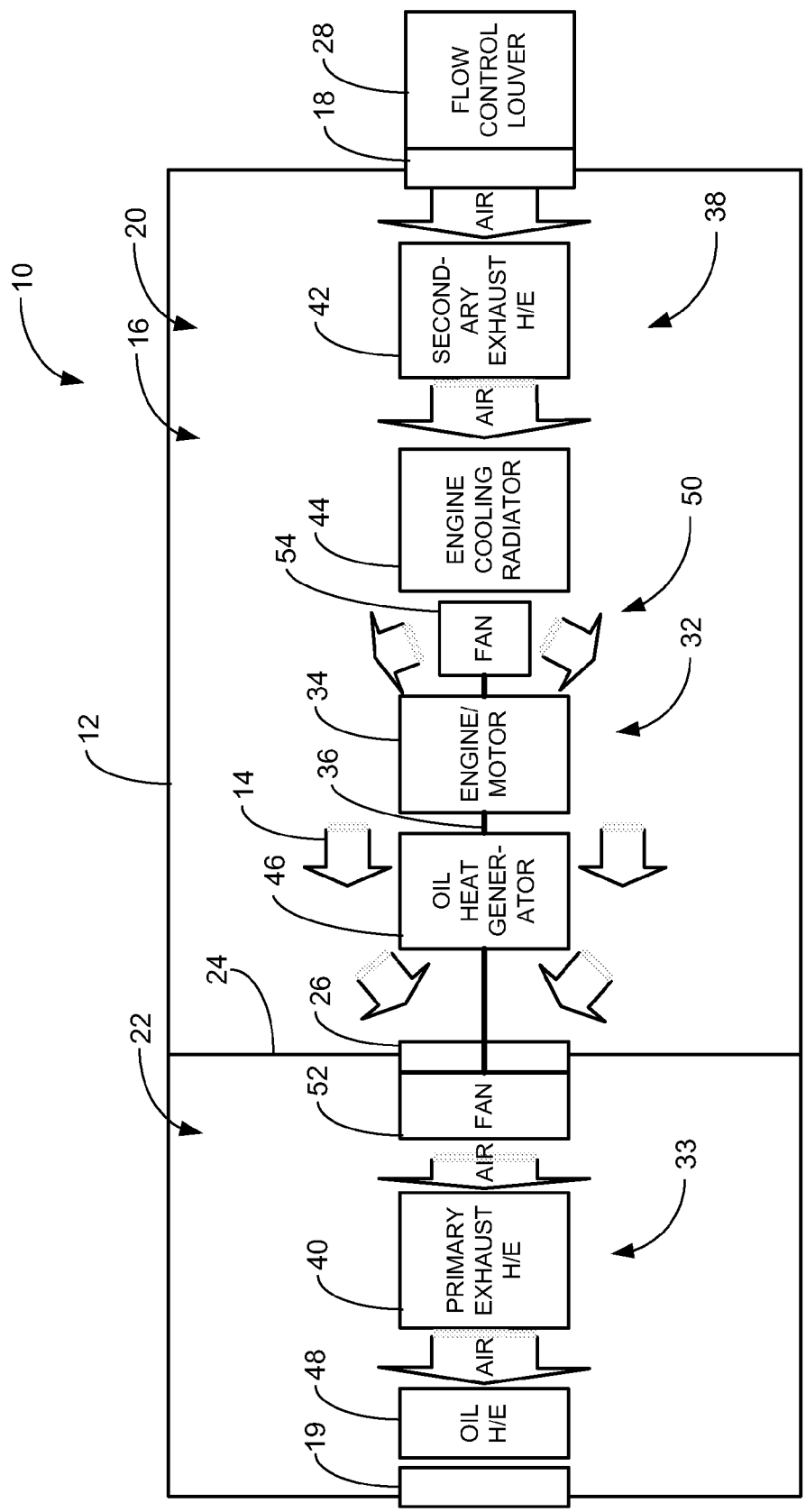
FIG. 2 is a schematic diagram of a new air heating apparatus showing the physical arrangement of various elements of the apparatus according to the present disclosure.
Figure 3:
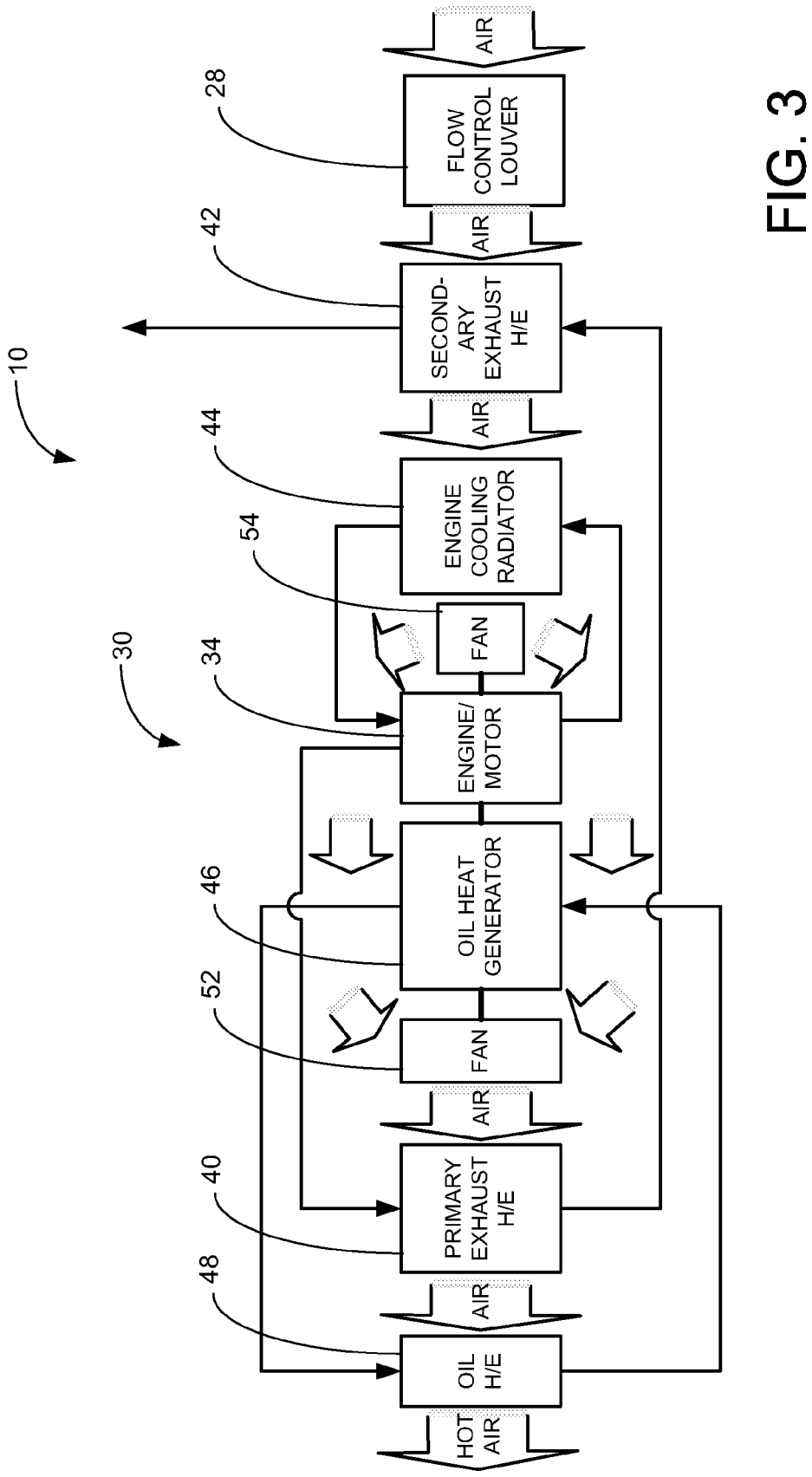
FIG. 3 is a schematic diagram of the connections of various elements of the air heating apparatus, according to an illustrative embodiment.

With reference now to the drawings, and in particular to FIGS. 1 through 3 thereof, a new air heating apparatus embodying the principles and concepts of the disclosed subject matter will be described.

In one aspect, the disclosure relates to an air heating apparatus 10 that is useful for heating air in a manner that is flameless, or does not employ an open flame to heat the air moving through the apparatus 10.

The air heating apparatus 10 may include a housing 12 through which air flows along a path 14 through the interior 16 of the housing. The housing 12 may have at least one inlet opening 18 and at least one outlet opening 19. The path 14 of the air flow extends between the upstream inlet opening 18 and the downstream outlet opening 19, and may pass through or by the elements of the apparatus described below. The inlet and outlet openings may be positioned at opposite ends of the housing 12, but that relationship is not critical.

Significantly, the interior of the housing 12 is divided into a primary chamber 20 and a secondary chamber 22. The primary chamber 20 may encompass a relatively upstream portion or section of the air path 14, and the secondary chamber 22 may encompass a relatively downstream portion or section of the air path. The primary chamber 20 may be characterized by having a relatively lower static air pressure therein during operation of the apparatus 10, and the secondary chamber 22 may be characterized by a relatively higher static pressure therein during operation of the apparatus.

To provide the primary 20 and secondary 22 chambers in the housing 12, the housing 12 may include an isolating wall 24 dividing the interior 16 of the housing into the primary and secondary chambers. The isolating wall 24 may extend in a plane oriented substantially perpendicular to the general direction of the path though the interior 16. The isolating wall 24 may have a transfer opening 26 formed therein for the path 14 to extend through such that air in the primary chamber 20 is able to move into the secondary chamber 22. The transfer opening 26 may form the only opening for air in the primary chamber to move into the secondary chamber, and may be positioned between the inlet 18 and outlet 19 openings.

In some embodiments, the housing 12 may include a flow control louver assembly 28 that is effective to control air flow into the inlet opening 18 of the housing 12, and may extend across the inlet opening to perform the function. One suitable flow control louver assembly is disclosed in U.S. Pat. No. 6,186,138, which is hereby incorporated by reference in its entirety.

The air heating apparatus 10 may include an air heating assembly 30 configured to heat air moving along the path 14 between the inlet and outlet openings. The air heating assembly may include a plurality of elements, and the elements may be arranged along the air path 14 such that the relative temperature of the various elements may generally increase from the inlet opening to the outlet opening. The air heating assembly 30 is positioned in the interior 16 of the housing, and a first portion 32 of the assembly 30 may be positioned in the primary chamber 20 and a second portion 33 of the assembly 30 may be positioned in the secondary chamber 22.

The air heating assembly 30 may include an energy source for the elements of the assembly 30, and in the illustrative embodiment comprises an engine 34 that rotates a drive shaft 36, and although the energy source may comprise other devices (such as an electrical motor), a fuel burning internal combustion engine has been found to provide the best source of flameless heat. The engine 34 may be positioned in the interior of the housing, such as in the primary chamber so that the engine is exposed to the air of relatively cooler air temperatures found in the primary chamber 20 and not the relatively hotter air temperatures found in the secondary chamber.

An engine exhaust heat recovery apparatus 38 may be included in the air heating assembly 30 to transfer exhaust heat of the engine 34 to the air flowing along the path 14. The engine exhaust heat recovery apparatus 38 may comprise a primary exhaust heat exchanger 40 that is in fluid communication with the combustion exhaust of the engine, such that exhaust gases from the engine pass through the primary exhaust heat exchanger after exiting the engine. The primary exhaust heat exchanger 40 may be positioned in the secondary chamber 22 in the path 14 of the air flow such that air passing through the secondary chamber 22 between the transfer opening 26 and the outlet opening 19.

The engine exhaust heat recovery apparatus 38 may further comprise a secondary exhaust heat exchanger 42 which may be positioned in the primary chamber 20. The secondary exhaust heat exchanger 42 may be in fluid communication with the primary exhaust heat exchanger 40 of the recovery apparatus 38, such that exhaust gases from the engine pass through the secondary exhaust heat exchanger after exiting the primary exhaust heat exchanger. In this arrangement, the relatively hotter exhaust gases pass through the primary exhaust heat exchanger in the secondary chamber where the air temperatures are relatively warmer, and after leaving the primary exhaust heat exchanger then move to the secondary exhaust heat exchanger in the primary chamber where the air temperatures are relatively cooler. Thus, in the air path 14, the secondary exhaust heat exchanger 42 is located upstream of the primary exhaust heat exchanger.

The air heating assembly 30 may further comprise an engine waste heat recovery assembly 44 that is configured to transfer waste heat of the engine to the air flow along the path 14. The engine waste heat recovery assembly may be located in the primary chamber 20 to transfer waste engine heat to the air flow in the primary chamber. Illustratively, the engine waste heat recovery assembly 30 may comprise a radiator through which coolant circulating through the engine also passes. The radiator may be positioned downstream of the secondary exhaust heat exchanger 42.

The air heating assembly 30 may also include a heat generator 46 that generates heat in a fluid from rotation energy received by the heat generator. The heat generator 46 may be operatively connected to the engine 34 so that the engine transfers rotation energy to the generator, such as through the rotation of the drive shaft 36 of the engine. The drive shaft 36 may be suitably connected to a rotatable part of the heat generator 46. The heat generator may be located in the primary chamber 22 of the housing. A highly suitable heat generator is disclosed in U.S. Pat. No. 5,819,724, which is hereby incorporated by reference in its entirety. The heat generator 46 may generate heat in a viscous fluid, such as oil, which is transferred out of the heat generator.

The fluid from the heat generator 46 may be passed to a main heat exchanger 48 that is configured to transfer heat generated by the heat generator to air flowing along the path 14. The main heat exchanger 48 may be in fluid communication with the heat generator 46 to provide this heat transfer therebetween. The main heat exchanger 48 may be positioned in the secondary chamber of the housing 12 such that heat from the heat generator is transferred to the air in the secondary chamber 22 and not to air in the primary chamber, where, for example, the engine 34 and heat generator 46 operate. In some embodiments, the main heat exchanger 48 may be the element of the air heating assembly that is located furthest downstream along the path 14, and may be positioned adjacent to the outlet opening of the housing.

The apparatus 10 may also include an air movement assembly 50 that is configured to move air along the path 14 through the interior 16 of the housing 12. The air movement assembly 50 may comprise a primary fan 52 that is positioned along the path 14 between the primary 20 and secondary 22 chambers to move air on the path from the primary to the secondary chamber. The primary fan 52 may be positioned proximate to the transfer opening 26 in the isolating wall 24 in a manner that is effective to move air from the primary chamber to the secondary chamber. In some embodiments, the primary fan may be located in the secondary chamber 22 adjacent to the wall 24 and in communication with the transfer opening, although this positioning is not critical. In some embodiments, the primary fan 52 comprises a centrifugal fan, and may be unducted such that air exiting the fan is able to travel in virtually all circumferential directions from the fan. The primary fan 52 may be, and preferably is, driven by the engine in addition to the heat generator 46. In some embodiments, the shaft extending from the engine on which the generator 46 is mounted also drives the primary fan so that both are driven on a common shaft, although this is not critical.

The air movement assembly 50 may also comprise a secondary fan 54 that is positioned along the path 14 at a location upstream from the primary fan 52. The secondary fan 54 may be positioned in the primary chamber 20, and may be relatively proximate to the inlet opening 18. The secondary fan 54 may be operatively connected to the engine 34 to be rotated by the engine, and may comprise an axial flow fan that may be positioned in a duct that helps to pull air though the secondary exhaust heat exchanger 42 and the radiator of the engine waste heat recovery assembly.

Advantageously, the air heating apparatus is able to develop a higher level of static pressure at the outlet opening than was previous achieved without the use of the primary fan in combination with the isolating wall and the primary and secondary chamber design. In some implementations, it has been noted that the level of static pressure existing at the outlet opening has been increased by 100%, although the actual increase in other implementations may be greater or lesser. In these configurations, the higher pressure air flow is not pushed along the entire path. The additional loading of the engine to drive the primary fan may also cause the engine to work harder, and the heat gained through the heat recovery systems may be greater.

As a further advantage, the primary fan 52 pushes air along the path 14 through the primary exhaust heat exchanger 40 and the main heat exchanger 48, which are the relatively higher temperature elements in the air heating assembly. These elements, and the air flowing over these elements, are isolated from the engine 34 and the heat generator 46 by the isolating wall and primary fan such that air flowing over these hotter elements in the secondary chamber is not able to then pass over and heat the air about the engine and heat exchanger in the primary chamber. This isolation of the engine and heat generator from, for example, the main heat exchanger and the primary exhaust heat exchanger, may limit any transfer of heat from these exchangers to the engine or the heat generator and may extend the life span of the engine and heat generator, which instead are exposed to the relatively lower or cooler temperature of the air in the primary chamber. While the engine waste heat recovery assembly, and the secondary exhaust heat exchanger when utilized, contribute some heat to the air in the primary chamber, this heating is beneficial to the operation of the engine and the heat generator, especially in cold climates where the ambient air temperature entering the inlet opening can be very low. The engine and heat generator are isolated from the hottest elements of the air heating assembly, such as the main heat exchanger and the primary exhaust heat exchanger when utilized, and the air about them.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An air heating apparatus comprising:
   a housing having at least one inlet opening and at least one outlet opening such that air may flow along a path through an interior of the housing between said openings, the housing including an isolating wall dividing the interior of the housing into a primary chamber adjacent to the inlet opening and a secondary chamber adjacent to the outlet opening, the isolating wall isolating an interior of the secondary chamber from an interior of the primary chamber, a transfer opening being formed in the isolating wall and through which air on the path is forced to move to pass from the interior of the primary chamber into the interior of the secondary chamber;
   an air heating assembly positioned in the interior of the housing and configured to heat air moving along the path, the air heating assembly comprising:
      an engine in the primary chamber configured to rotate a drive shaft;
      a heat generator in the primary chamber and operatively connected to the engine to generate heat in a fluid from rotation energy from the engine;
      a main heat exchanger in the secondary chamber and in fluid communication with the heat generator to transfer heat generated by the heat generator to air flowing along the path;
      an engine exhaust heat recovery apparatus configured to transfer exhaust heat of the engine to the air flowing along the path; and
   an air movement assembly configured to move air along the path through the interior of the housing, the air movement assembly comprising a primary fan positioned along the path between the primary and secondary chambers to move air on the path from the primary chamber to the secondary chamber, the primary fan being positioned at the transfer opening wall such that operation of the primary fan pulls air from the primary chamber and pushes the air into the secondary chamber along the path and from the secondary chamber out of the housing through the outlet opening;
   wherein air moves from the primary chamber to the secondary chamber through only said transfer opening between the primary and secondary chambers to form a single said path for air flow from the inlet opening and the outlet opening through the housing;
   wherein the engine exhaust heat recovery apparatus comprises an exhaust heat exchanger, the heat exchanger being in fluid communication with the exhaust of the engine such that exhaust gases from the engine pass through the exhaust heat exchanger after exiting the engine.

2. The apparatus of claim 1 wherein the exhaust heat exchanger is located in the secondary chamber.

3. The apparatus of claim 1 wherein the exhaust heat exchanger forms a primary exhaust heat exchanger of the engine exhaust heat recovery apparatus; and
   wherein the engine exhaust heat recovery apparatus comprises a secondary exhaust heat exchanger in the primary chamber, the secondary exhaust heat exchanger being in fluid communication with the primary exhaust heat exchanger such that exhaust gases from the engine pass through the secondary exhaust heat exchanger after exiting the primary exhaust heat exchanger.

4. The apparatus of claim 3 wherein the exhaust heat exchanger is located in the secondary chamber and the a secondary exhaust heat exchanger is located in the primary chamber.

5. The apparatus of claim 1 wherein the air movement assembly further comprises a secondary fan positioned in the primary chamber to draw air through the engine exhaust heat recovery apparatus through which coolant for the engine passes to recover heat from operation of the engine.

6. The apparatus of claim 5 wherein both of the primary and secondary fans are operatively connected to the engine to be rotated by the engine to move air along the path.

7. The apparatus of claim 1 wherein the main heat exchanger is located further downstream in the path than the engine and the heat generator, and the main heat exchanger being located adjacent to the outlet opening of the housing.

8. The apparatus of claim 1 wherein the air heating assembly further comprises an engine waste heat recovery assembly in the primary chamber configured to transfer waste heat of the engine to the air flow along the path.

9. The apparatus of claim 8 wherein the engine waste heat recovery assembly comprises a radiator through which coolant from the engine passes through.

10. An air heating apparatus comprising:
a housing having at least one inlet opening and at least one outlet opening such that air may flow along a path through an interior of the housing between said openings, the housing including an isolating wall dividing the interior of the housing into a primary chamber adjacent to the inlet opening and a secondary chamber adjacent to the outlet opening, the isolating wall isolating an interior of the secondary chamber from an interior of the primary chamber, a transfer opening formed in the isolating wall and through which air on the path is caused to move in order to pass from the interior of the primary chamber into the interior of the secondary chamber;
an air heating assembly positioned in the interior of the housing and configured to heat air moving along the path, the air heating assembly comprising:
an engine in the primary chamber configured to rotate a drive shaft;
a heat generator in the primary chamber and operatively connected to the engine to generate heat in a fluid from rotation energy from the engine;
a main heat exchanger in the secondary chamber and in fluid communication with the heat generator to transfer heat generated by the heat generator to air flowing along the path;
an engine exhaust heat recovery apparatus configured to transfer exhaust heat of the engine to the air flowing along the path, the engine exhaust heat recovery apparatus comprising an exhaust heat exchanger in one of the chambers; and
an air movement assembly configured to move air along the path through the interior of the housing, the air movement assembly comprising:
a primary fan positioned along the path between the primary and secondary chambers to move air on the path from the primary chamber to the secondary chamber, the primary fan being positioned at the transfer opening in the isolating wall in a manner effective to move air from the primary chamber to the secondary chamber and from the secondary chamber out of the housing through the outlet opening; and
a secondary fan positioned in the primary chamber to draw air through an engine exhaust heat recovery apparatus through which coolant for the engine passes to recover heat from operation of the engine; and
wherein both of the primary and secondary fans are operatively connected to the engine to be rotated by the engine to move air along the path.

11. The apparatus of claim 10 wherein the exhaust heat exchanger is located in the secondary chamber.

12. The apparatus of claim 10 wherein the exhaust heat exchanger forms a primary exhaust heat exchanger of the engine exhaust heat recovery apparatus; and
wherein the engine exhaust heat recovery apparatus comprises a secondary exhaust heat exchanger in the primary chamber, the secondary exhaust heat exchanger being in fluid communication with the primary exhaust heat exchanger such that exhaust gases from the engine pass through the secondary exhaust heat exchanger after exiting the primary exhaust heat exchanger.

13. The apparatus of claim 12 wherein the exhaust heat exchanger is located in the secondary chamber and the secondary exhaust heat exchanger is located in the primary chamber.

14. An air heating apparatus comprising:
a housing having at least one inlet opening and at least one outlet opening such that air may flow along an air flow path through an interior of the housing between said openings, the air inlet opening being located upstream in the air flow path and the air outlet opening being located downstream in the air flow path, the housing including an isolating wall dividing the interior of the housing into a primary chamber adjacent to the inlet opening and a secondary chamber adjacent to the outlet opening, the isolating wall having a transfer opening positioned between the primary and secondary chambers, the air flow path extending from the primary chamber through the transfer opening of the isolating wall into the secondary chamber;
an air heating assembly positioned in the interior of the housing and configured to heat air moving along the air flow path, the air heating assembly comprising:
an internal combustion engine in the primary chamber configured to rotate a drive shaft and having an exhaust with combustion exhaust gases;
an engine waste heat recovery assembly positioned in the primary chamber downstream from the secondary exhaust heat exchanger to receive air flow from the secondary exhaust heat exchanger, the engine waste heat recovery assembly being configured to transfer waste heat from coolant fluid of the engine to the air flow along the air flow path;
a heat generator positioned in the primary chamber downstream of the engine waste heat recovery assembly and operatively connected to the drive shaft of the engine to generate heat in a fluid from rotation energy from the engine, the heat generator heating the fluid without utilizing an open flame;
a primary exhaust heat exchanger positioned in the secondary chamber downstream from the engine waste heat recovery assembly to receive air flow from the engine waste heat recovery assembly, the primary heat exchanger being in fluid communication with the exhaust of the engine such that exhaust gases from the engine pass through the primary exhaust heat exchanger after exiting the engine;

a main heat exchanger positioned in the secondary chamber downstream from the primary exhaust heat exchanger to receive air flow from the primary exhaust heat exchanger, the main heat exchanger being in fluid communication with the heat generator to transfer heat generated by the heat generator to air flowing along the air flow path; and an air movement assembly including:

a primary fan positioned at the transfer opening in the isolating wall such that operation of the primary fan pulls air from the primary chamber and pushes the air into the secondary chamber along the path;

a secondary fan positioned in the primary chamber to draw air through the engine exhaust heat recovery apparatus; and wherein both of the primary and secondary fans are operatively connected to the engine to be rotated by the engine to move air along the path.

15. The apparatus of claim 14 additionally comprising a secondary exhaust heat exchanger positioned in the primary chamber downstream from the inlet opening of the housing in the air flow path to receive air flow from the inlet opening, the secondary exhaust heat exchanger being in fluid communication with the primary exhaust heat exchanger such that exhaust gases from the engine pass through the secondary exhaust heat exchanger after passing through the primary exhaust heat exchanger.

* * * * *